United States Patent [19]
Wise et al.

[11] Patent Number: 5,460,501
[45] Date of Patent: Oct. 24, 1995

[54] PIPE PRODUCTION LINE FOR THE MANUFACTURE OF PLASTIC PIPE

[75] Inventors: John Wise; Larry L. Martin, both of Hamilton, Ohio

[73] Assignee: Advanced Drainage Systems, Inc., Columbus, Ohio

[21] Appl. No.: 224,541

[22] Filed: Apr. 7, 1994

[51] Int. Cl.$^6$ .................................................. B29C 47/90
[52] U.S. Cl. ........................... 425/71; 425/190; 425/325; 425/380; 425/388; 425/393; 264/209.4
[58] Field of Search .................... 425/67, 70, 71, 425/384, 388, 393, 392, 85, 190, 404, 325, 68, 326.1, 380; 264/209.4

[56] References Cited

U.S. PATENT DOCUMENTS

| | | | |
|---|---|---|---|
| 4,573,893 | 3/1986 | Waters et al. | 425/71 |
| 4,710,337 | 12/1987 | Nordstrom | 284/209.4 |
| 5,085,567 | 2/1992 | Neumann | 425/71 |
| 5,271,786 | 12/1993 | Gorney et al. | 425/71 |
| 5,288,218 | 2/1994 | Melkonian | 425/71 |
| 5,296,188 | 3/1994 | Lupke | 284/209.4 |

Primary Examiner—Khanh P. Nguyen
Attorney, Agent, or Firm—Biebel & French

[57] ABSTRACT

An improved pipe production line is provided having an improved manifold assembly component and an improved former component. The improved manifold assembly for use with a die in the extrusion of plastic includes a water inlet tube, a tube through which a vacuum is pulled, a water return tube, a calibration finger first section having an outer surface, the first section having at least one water receiving channel connected to the water inlet tube and the first section having a channel connected to the tube through which a vacuum is pulled, and the first section having the water return tube positioned centrally of the first section outer surface, with the first section having formed therein apertures connected to the channel connected to the tube through which a vacuum is pulled, and a calibration finger second section having an outer surface and an interior channel, with the second section having the water return tube positioned centrally of the second section outer surface, and the second section having formed therein apertures connected to the interior channel.

9 Claims, 13 Drawing Sheets

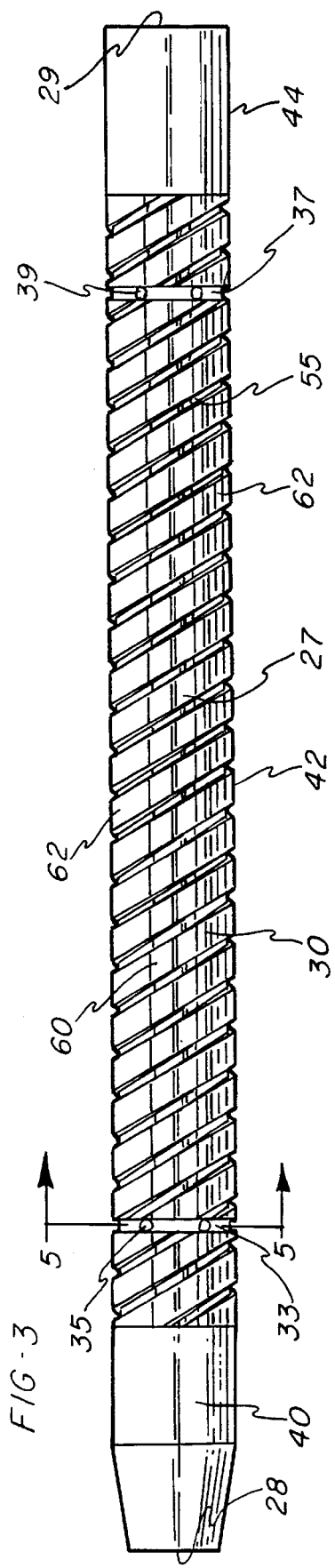
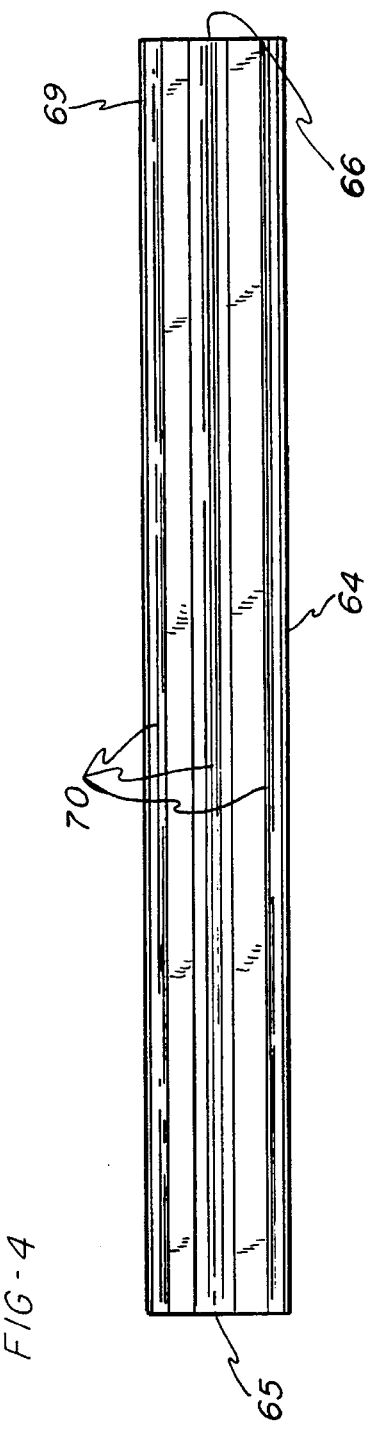
FIG-3
FIG-4

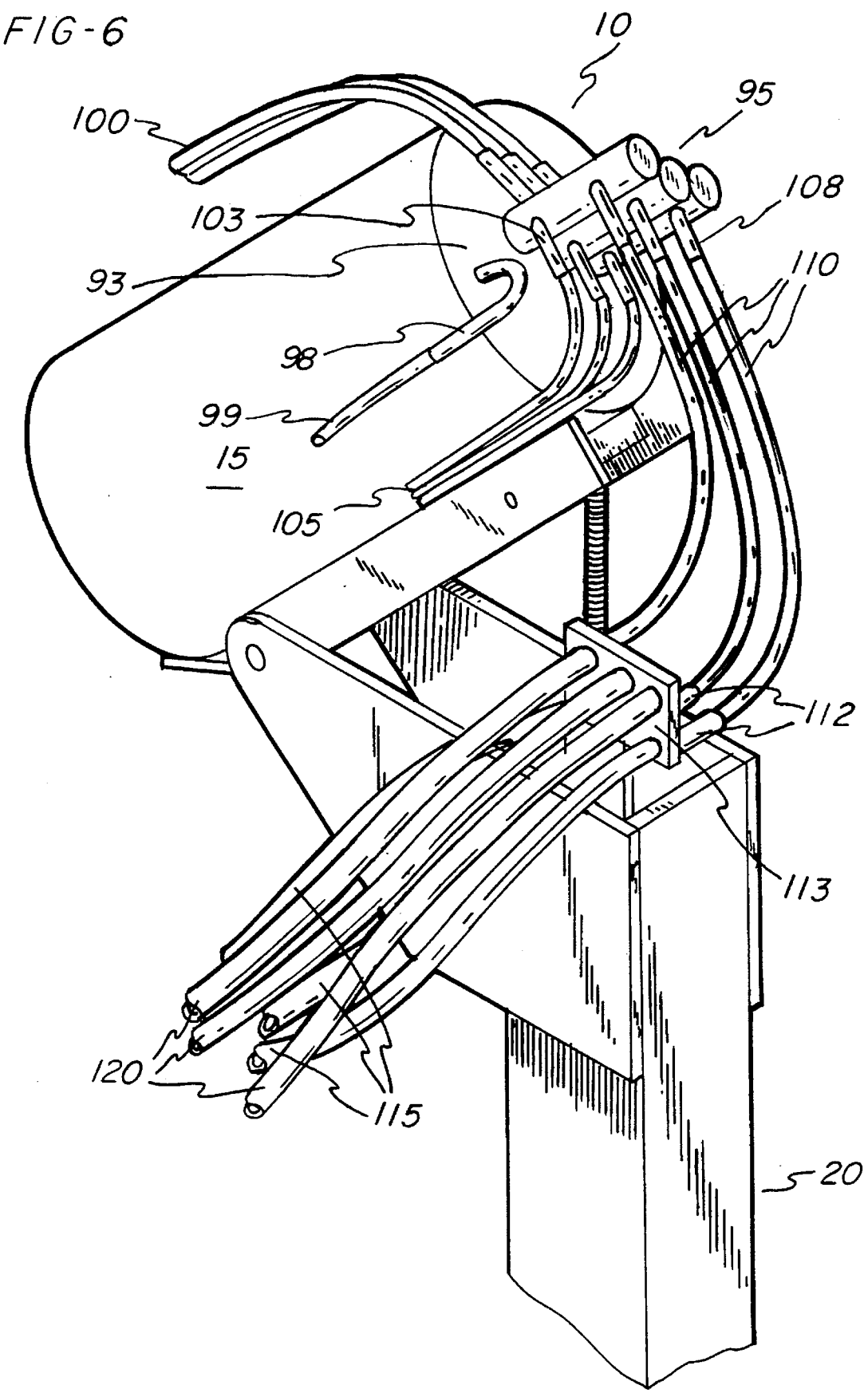

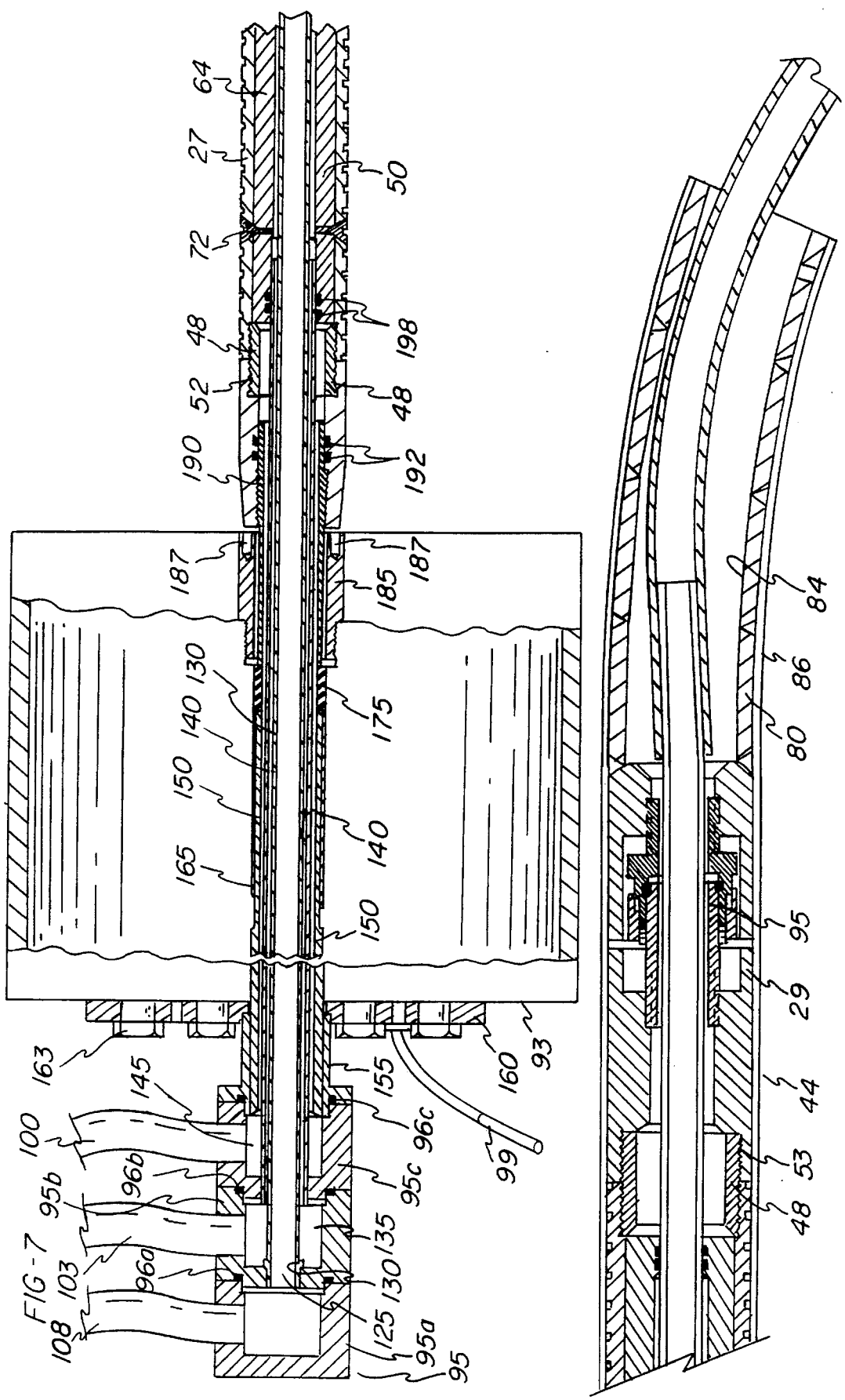

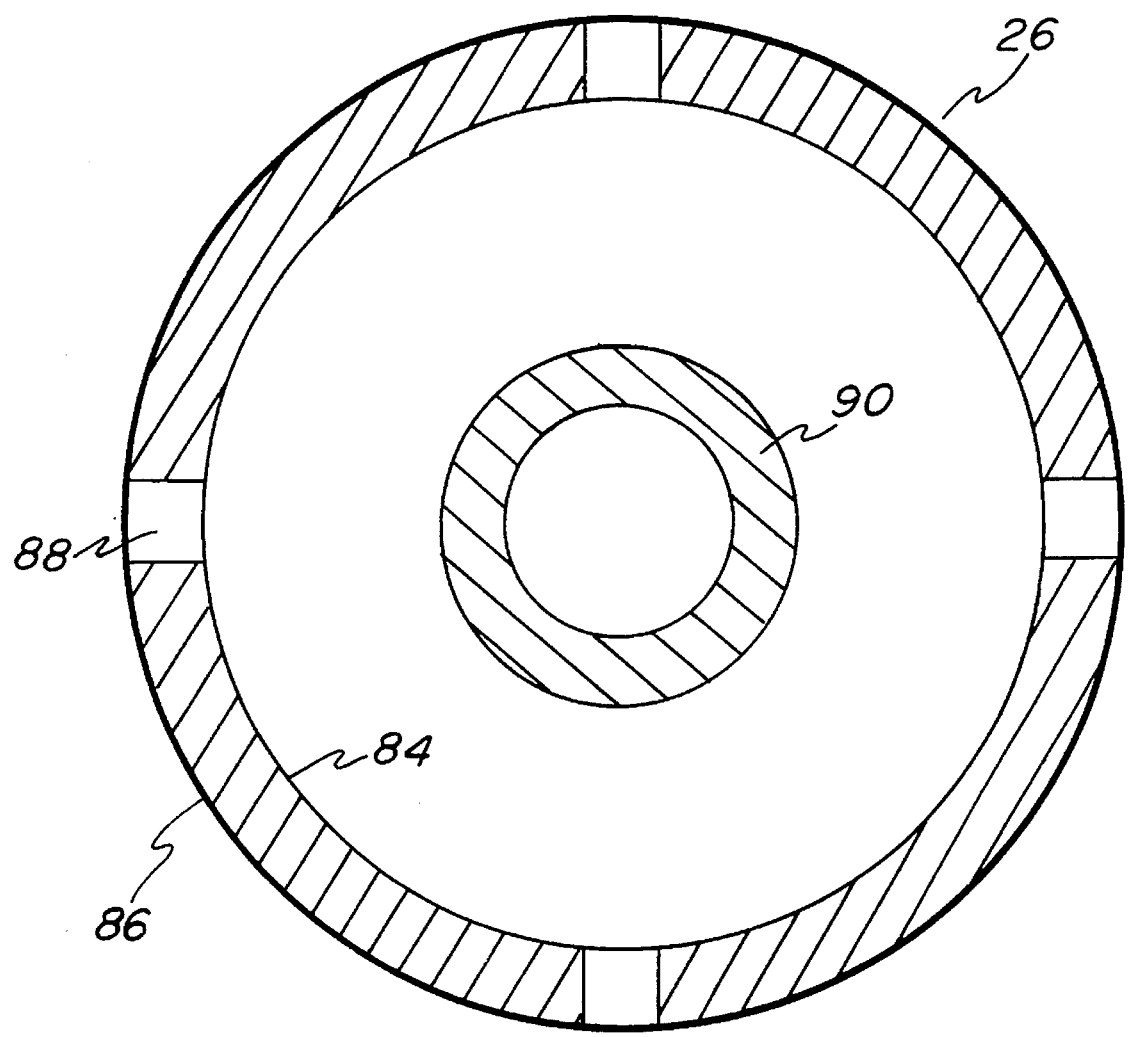

FIG·10

PIPE PRODUCTION LINE FOR THE MANUFACTURE OF PLASTIC PIPE

BACKGROUND OF THE INVENTION

This invention relates generally to machinery for the manufacture of plastic pipe, and more particularly to a machine capable of forming more than just one diameter of an improved pipe structure which features a pipe wall with apertures therein when the pipe is examined in cross-section.

Plastic pipe has found a variety of uses especially relating to drainage. One of the concerns in the manufacture of plastic pipe is the amount of raw materials consumed and the resultant weight of the finished product. For example, 48" interior diameter solid wall plastic pipe weighs approximately 200 lbs per foot. It has recently been discovered that plastic pipe having apertures formed therein, when the pipe is viewed in cross-section, weighs approximately 30 lbs per linear foot. However, a problem exists in designing a machine capable of manufacturing pipe having the desired cross-section. Another of the concerns in the manufacture of plastic pipe is the attendant costs associated with the manufacturing equipment.

In general, extruded plastic pipe is formed on a production line having a variety of specific machines incorporated into the manufacturing process. One of the first machines is an extruder. Plastic powder, or more preferably pellets, is fed through the extruder where it is subjected to high temperatures such that the plastic melts. The plasticized plastic then proceeds through a feed tube, at the end of which the plastic enters into a typically drum shaped die. At the front of the die is the specific cross-section profile to be extruded. As the hot plastic comes out of the die, it passes over what are called calibrating or calibration fingers which assist in maintaining the desired cross-sectional form which has been extruded. These calibration fingers are part of the manifold assembly. The rest of the manifold assembly extends from above the die to well beyond the calibration fingers. In addition to the extruder and die, which is supported on a die post assembly, plastic pipe is manufactured using a former or forming head.

Prior art manifold assemblies have apparently limited the ability to manufacture a plastic product having a cross-section which incorporates apertures. It is thus apparent that the need exists for an improved manifold assembly which manufactures a product having the desired cross-section.

Additionally, until now, the former assemblies used to manufacture plastic pipe have been a very limiting factor in the manufacture of such pipe. For example, 48" interior diameter plastic pipe is very popular for large civil engineering applications. Existing prior art formers for manufacturing such pipe can basically make pipe of approximately that dimension, but the specific dimensions that ultimately result often depend on the specific type of plastic used. Attempting to "fine tune" the diameter of large diameter plastic pipe is not realistically possible.

Even more importantly however, is the fact that 42" pipe is also popular, and that in the existing art, to make pipe of that diameter requires an additional complete former assembly: a costly capital investment. There are other popular sizes of large diameter plastic pipe, namely 30", 36", 54" and 60", all of which sizes until now have required separate former assemblies as a condition for their manufacture. Thus it can be appreciated that for a company to manufacture the four most popular sizes of large diameter plastic pipe, it has been necessary to invest in at least four former assemblies. Even then, the manufacturing tolerances associated with the pipe formed on such machines is relatively large, since there has been no means to minutely adjust the diameter of the pipe as it is initially being formed.

Prior art former assemblies have been relatively limited as to their ability to manufacture more than just one diameter of plastic pipe, with that pipe having to have relatively large tolerances associated therewith. It is thus apparent that the need exists for an improved former assembly which manufactures a product having more than just one of the desired diameters of large diameter plastic pipe, and moreover a product whose diameter can be minutely adjusted.

SUMMARY OF THE INVENTION

The problems associated with prior pipe production lines are overcome in accordance with the present invention by an improved pipe production line comprising an improved manifold assembly component and an improved former component. The improved manifold assembly for use with a die in the extrusion of plastic comprises a water inlet tube, a tube through which a vacuum is pulled, a water return tube, a calibration finger first section having an outer surface, the first section having at least one water receiving channel connected to the water inlet tube and the first section having a channel connected to the tube through which a vacuum is pulled, and the first section having the water return tube positioned centrally of the first section outer surface, with the first section having formed therein apertures connected to the channel connected to the tube through which a vacuum is pulled, and a calibration finger second section having an outer surface and an interior channel, with the second section having the water return tube positioned centrally of the second section outer surface, and the second section having formed therein apertures connected to the interior channel.

The improved former assembly component which can be adjusted to accommodate the forming of more than one diameter of plastic pipe comprises a housing, a center tube supported on the housing, a plurality of rollers oriented about the center tube, each of the rollers having a first end and a second end, a plurality of universal joint assemblies each having a first end and a second end, each of the first ends being connected to the housing and each of the second ends being connected to one of the rollers, and two pairs of cooperating plates, each pair of plates comprising a cam plate and a bearing block plate, each pair of plates being connected to the rollers, the first pair of plates located adjacent the first end of the rollers and the second pair of plates located adjacent the second end of the rollers.

The improved pipe production line comprises a former with the cam plates having formed therein a plurality of slots, each of the bearing block plates being connected to a roller and each of the bearing block plates having connected thereto a shoulder bolt with bushing, each shoulder bolt with bushing extending through one of the slots, with the cam plate and the bearing block plate able to be rotated relative to each other such that when the plates are rotated each respective shoulder bolt with bushing slides along its respective slot causing each roller to be adjusted radially relative to the center tube.

The improved pipe production line also comprises a former with the center tube having a main water inlet tube pass therethrough, with the main water inlet tube connected to a plurality of individual water inlet tubes, one each of the individual water inlet tubes connected to a respective roller at the roller second end, each roller formed having an interior tube and an outer tube, each roller second end also connected to individual water outlet tubes, with the individual water outlet tubes passing completely through the center tube in the direction of the roller first end.

There is also disclosed an improved pipe production line comprising an improved manifold assembly component and an improved former component. The improved manifold assembly for use with a die in the extrusion of plastic comprises a water inlet tube, a tube through which a vacuum is pulled, a water return tube, a calibration finger first section and a calibration finger second section. The calibration finger first section has an outer surface, at least one water receiving channel connected to the water inlet tube, a channel connected to the water inlet tube through which a vacuum is pulled, and with the water return tube positioned centrally of the first section outer surface. The first section outer surface has formed therein a spiral groove and at least two radial grooves, with the spiral groove intersecting at least two radial grooves. The first section also has formed therein apertures connected to the channel connected to the tube through which a vacuum is pulled, with the first section apertures located in the radial groove, and with the water return tube having a first component and a second component secured to each other. The first component terminates within the second section, and the second component extends beyond the second section. The second component is flexible.

The calibration finger second section has an outer surface and an interior channel. The second section also has the water return tube positioned centrally of the second section outer surface. The second section has formed therein apertures connected to the interior channel. The first section apertures have a first diameter and the second section apertures have a second diameter, with the second diameter being greater than the first diameter.

The improved former assembly component which can be adjusted to accommodate the forming of more than one diameter of plastic pipe comprises a housing, a center tube supported on the housing, a plurality of rollers oriented about the center tube, each of the rollers having a first end and a second end, a plurality of universal joint assemblies each having a first end and a second end, each of the first ends being connected to the housing and each of the second ends being connected to one of the rollers, and two pairs of cooperating plates, each pair of plates comprising a cam plate and a bearing block plate, each pair of plates being connected to the rollers, the first pair of plates located adjacent the first end of the rollers and the second pair of plates located adjacent the second end of the rollers.

The improved pipe production line comprises a former with the cam plates having formed therein a plurality of slots, each of the bearing block plates being connected to a roller and each of the bearing block plates having connected thereto a shoulder bolt with bushing, each shoulder bolt with bushing extending through one of the slots, with the cam plate and the bearing block plate able to be rotated relative to each other such that when the plates are rotated each respective shoulder bolt with bushing slides along its respective slot causing each roller to be adjusted radially relative to the center tube.

The improved pipe production line also comprises a former with the center tube having a main water inlet tube pass therethrough, with the main water inlet tube connected to a plurality of individual water inlet tubes, one each of the individual water inlet tubes connected to a respective roller at the roller second end, each roller formed having an interior tube and an outer tube, each roller second end also connected to individual water outlet tubes, with the individual water outlet tubes passing completely through the center tube in the direction of the roller first end.

There is also disclosed an improved pipe production line comprising an improved manifold assembly component and an improved former component. The manifold assembly comprises a plurality of tubular assemblies, each of which tubular assemblies comprise a water inlet tube, a tube through which a vacuum is pulled, a water return tube, a calibration finger first section and a calibration finger second section. The calibration finger first section has an outer surface, and has at least one water receiving channel connected to the water inlet tube, a channel connected to the tube through which a vacuum is pulled, and the water return tube positioned centrally of the first section outer surface. The first section has formed therein apertures connected to the channel connected to the tube through which a vacuum is pulled.

The calibration finger second section has an outer surface and an interior channel. The second section has the water return tube positioned centrally of the second section outer surface, and the second section has formed therein apertures connected to the interior channel.

The improved former assembly component which can be adjusted to accommodate the forming of more than one diameter of plastic pipe comprises a housing, a center tube supported on the housing, a plurality of rollers oriented about the center tube, each of the rollers having a first end and a second end, a plurality of universal joint assemblies each having a first end and a second end, each of the first ends being connected to the housing and each of the second ends being connected to one of the rollers, and two pairs of cooperating plates, each pair of plates comprising a cam plate and a bearing block plate, each pair of plates being connected to the rollers, the first pair of plates located adjacent the first end of the rollers and the second pair of plates located adjacent the second end of the rollers.

The improved pipe production line comprises a former with the cam plates having formed therein a plurality of slots, each of the bearing block plates being connected to a roller and each of the bearing block plates having connected thereto a shoulder bolt with bushing, each shoulder bolt with bushing extending through one of the slots, with the cam plate and the bearing block plate able to be rotated relative to each other such that when the plates are rotated each respective shoulder bolt with bushing slides along its respective slot causing each roller to be adjusted radially relative to the center tube.

The improved pipe production line also comprises a former with the center tube having a main water inlet tube pass therethrough, with the main water inlet tube connected to a plurality of individual water inlet tubes, one each of the individual water inlet tubes connected to a respective roller at the roller second end, each roller formed having an interior tube and an outer tube, each roller second end also connected to individual water outlet tubes, with the individual water outlet tubes passing completely through the center tube in the direction of the roller first end.

It is the primary object of the present invention to provide an improved former assembly which can manufacture pipe having at least two of the popular inner diameters of large diameter plastic pipe.

It is another object of the present invention to provide an improved former assembly which can slightly adjust the inner diameter of plastic pipe as it is formed to account for differences in the cooling of various types of plastic, and to allow manufacturing of pipe with more exacting tolerances.

Other objects and advantages of the invention will be apparent from the following description, the accompanying drawings, and the appended claims.

BRIEF DESCRIPTION OF THE DRAWINGS

FIG. 3 is a side elevational view of the calibration finger first section of the improved manifold assembly of this invention.

FIG. 4 is a side elevational view of the intermediate tube which in the preferred embodiment of the invention is formed and then inserted within the calibration finger first section shown in FIG. 3.

FIG. 6 is a perspective view on a greatly enlarged scale taken from the top of the die of FIG. 1.

FIG. 7 is a vertical cross-sectional view on an enlarged scale taken along line 7—7 of FIG. 2.

FIG. 8 is a vertical cross-sectional view on a greatly enlarged scale taken along line 8—8 of FIG. 1.

DETAILED DESCRIPTION OF THE INVENTION

Figure 1:
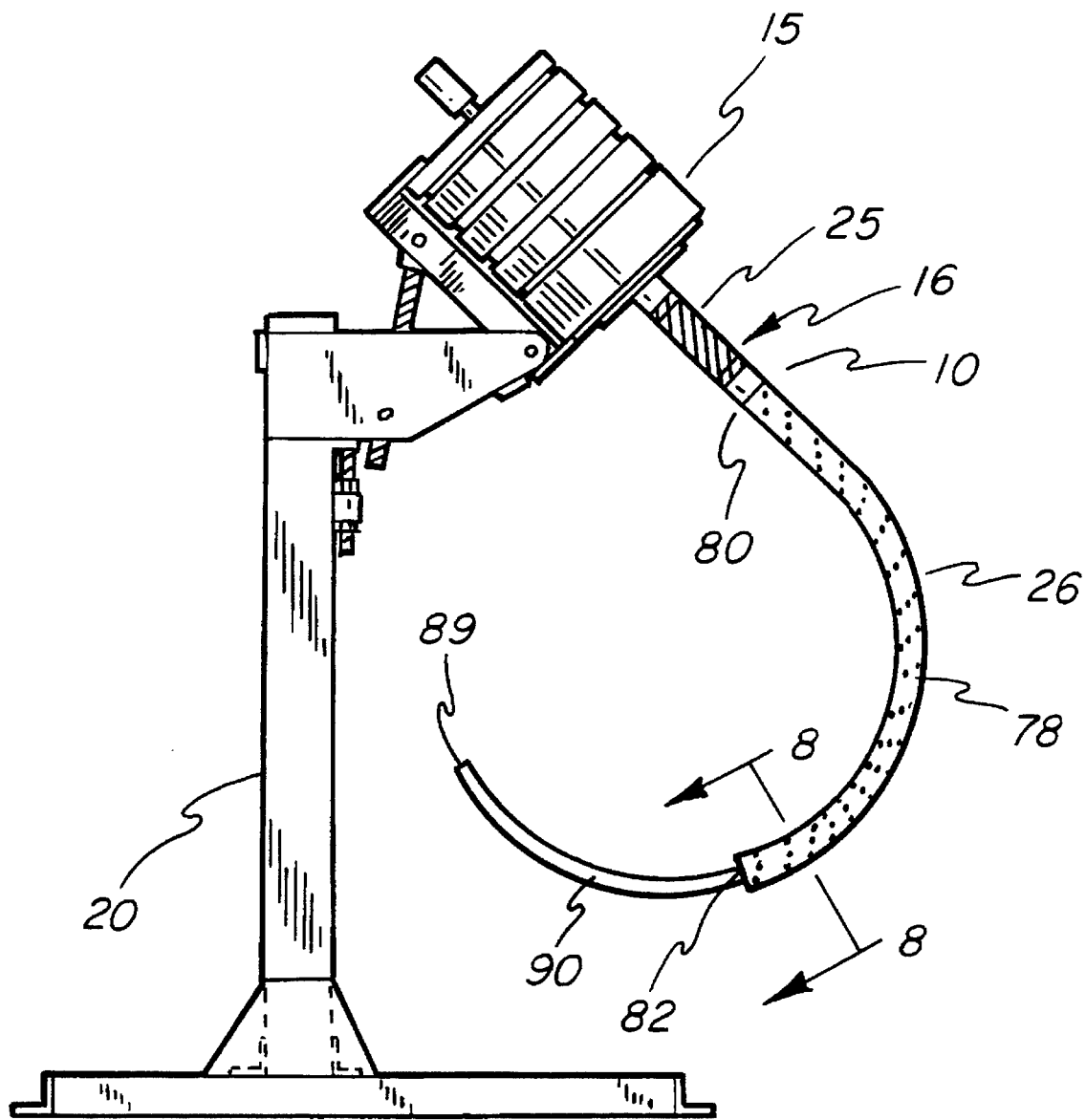
FIG. 1 is a side view of a die and die post assembly with a manifold assembly formed in accordance with the present invention secured thereto in an operative position.

Having reference to the drawings, attention is directed first to FIG. 1 which discloses the improved manifold assembly associated with this present invention generally disclosed by the numeral 10. The manifold assembly extends through die 15. Drum shaped die 15 is supported on a die post assembly 20. The die and die post are of the type found in plastic extrusion manufacture. The preferred embodiment of this invention utilizes a side fed spiral feed die, although it could use a side fed spider die. Similarly, the improved manifold calibration fingers 16 are located where calibration fingers of the prior art have been located, namely, at the end of the die where the plastic is extruded therefrom.

Figure 2:
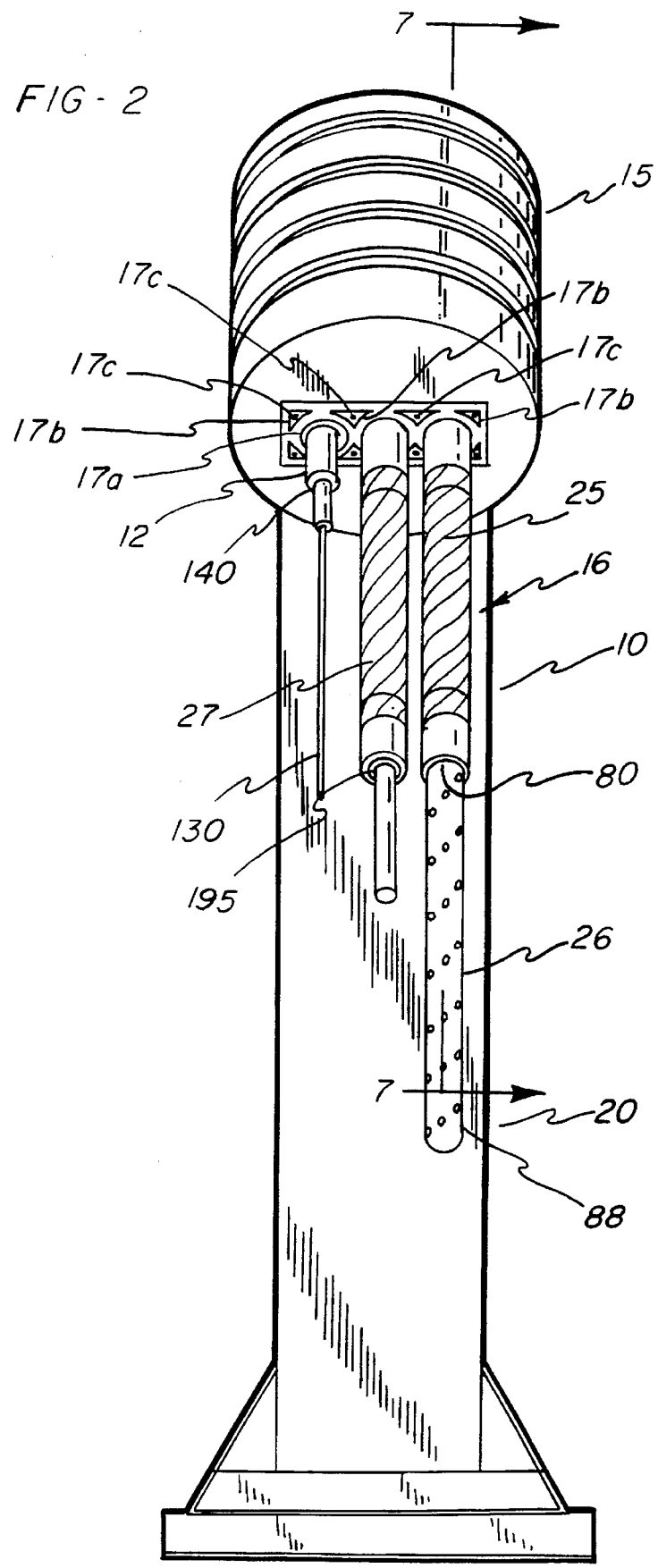
FIG. 2 is a front elevational view of a die and die post assembly in which the die will extrude the wall of a plastic pipe having apertures formed therein, specifically 8 small generally triangular shaped apertures as well as 3 larger generally circular shaped apertures.

This spatial relationship can better be appreciated from consideration of FIG. 2 which discloses the presence of a die head 17. Die heads are well known in the conventional extrusion art. However, this particular die head discloses the presence of 8 small triangular sections and 3 larger circular sections which will permit the extrusion of a pipe wall having a plurality of apertures formed therein. Extending through the die and die head 17 is a portion of the die manifold assembly 10 to which this invention is physically secured. This portion of the die manifold assembly 10 is shown at the left-most side of the die head 17 and extends some distance from the drum-shaped die, as will be discussed below.

At the right-most side of the die head 17 is the calibration finger 16 associated with the manifold 10 of this present invention shown in its complete assembly, as can be appreciated from a comparison with FIG. 1. The calibration finger 16 associated with this invention is formed having a first section 25 and a second section 26. The first section or tubular member 25 is shown secured by itself to the portion of the die manifold assembly 10 which passes through the die 15 at the center portion of the die head 17 in FIG. 2.

The first tubular member 25 is formed in the preferred embodiment of the invention having a tubular outer shell 27. As be better appreciated from a comparison of FIGS. 2 with FIGS. 3, 5 and 7, the tubular outer shell 27 has a first end as well as a second end, 28 and 29 respectively. Additionally, the outer shell 27 is formed having an outer surface 30 with this outer surface 30 having formed therein a first radial groove 33. Formed in the first radial groove are a plurality of first section apertures 35. Additionally, in the preferred embodiment of the invention a second radial groove 37 is formed having a plurality of second section apertures 39 formed therein.

The tubular outer shell is preferably formed having a first finger end 40, a finger shell 42, and a second finger end 44. These three pieces are components of the tubular outer shell and are secured to each other by respective brass connecting rings 48. Each connecting ring 48 is merely a ring with a threaded outer surface which engages with a portion of the inner surface of the finger shell 42. A threaded portion of the inner surface of first finger end 40 also engages with the connecting ring 48, with that first finger end inner surface being 52. A threaded portion of the inner surface of second finger end 44 also engages with the connecting ring 48, with that second finger end inner surface being 53. It will be appreciated from FIG. 3 that the first finger end is tapered towards the die head. This permits an easier initial flow of the heated plastic over the calibration finger 16 as the plastic exits the die head 17.

In addition to first radial groove 33 and second radial groove 37 the outer surface 30 of tubular outer shell 27 also preferably has formed therein a spiral groove 55. It should also be appreciated that the spiral groove intersects with both the first radial groove and the second radial groove in the preferred embodiment of the invention. It will also be appreciated from a comparison of FIGS. 3 and 5 that the outer shell of the first section 25 of the centralmost set of tubes is preferably formed having two relatively flat surface portions 60 and two curved surface portions 62, whereas the outer two sets of tubes have a flat surface only with respect to their inner side wall as can be seen in FIGS. 5A and 5B respectively.

Figure 5:
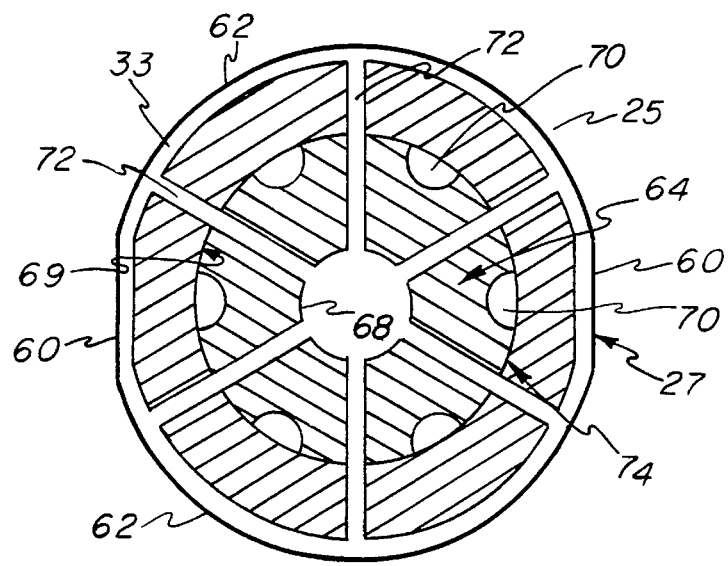
FIG. 5 is a vertical sectional view taken on a greatly enlarged scale along line 5—5 of FIG. 3, however, this particular view shows the calibration finger first section as assembled thereby disclosing both the outer shell as well as the presence of the intermediate tube.
Figure 5A:
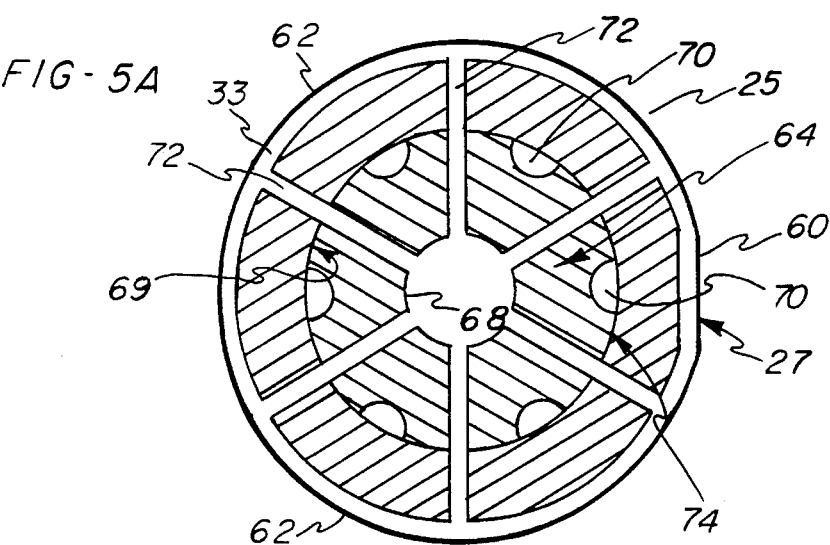
FIG. 5A is a vertical sectional view taken on a greatly enlarged scale and similar to FIG. 5, however, this particular view shows one of the endmost calibration finger first section as assembled.
Figure 5B:
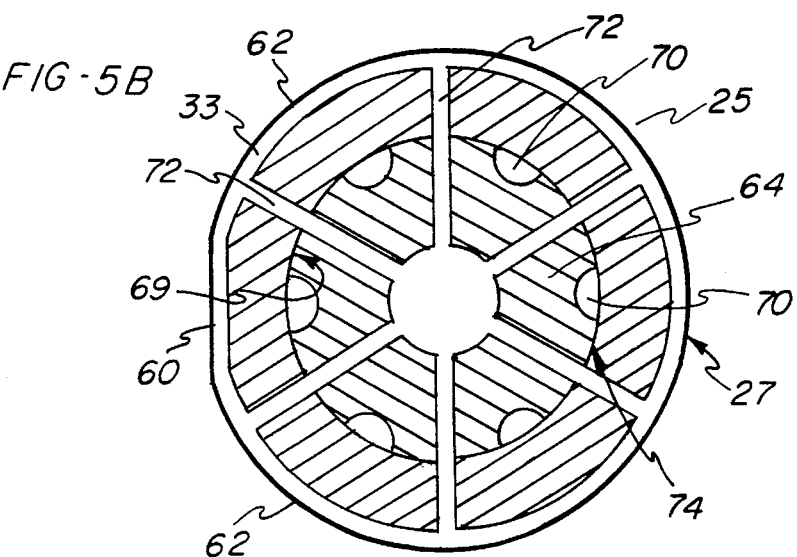
FIG. 5B is a vertical sectional view taken on a greatly enlarged scale and similar to FIGS. 5 and 5A, however, this particular view shows the other endmost calibration finger first section as assembled.

The intermediate tube 64 shown in FIG. 4 also has a first end 65 and a second end 66, and an inner surface 68 as can be appreciated from FIG. 5 as well as the outer surface 69 as can be appreciated from both FIGS. 4 and 5. A plurality of generally longitudinally extending channels 70 are formed in the outer surface 69 of intermediate tube 64. In the preferred embodiment of the invention there are six such water receiving channels 70.

As stated above, FIG. 5 shows a vertical cross-sectional view on a greatly enlarged scale wherein the intermediate tube is positioned so as to be encircled by the tubular outer shell 27. As such, the various water receiving channels 70 may be seen to become enclosed such that they permit the passage of water in a first direction through the die and towards the second section. Additionally, the presence of the cool water in the six channels helps to cool the tubular outer shell in the presence of the hot plastic.

As can also be seen in FIG. 5, the first tubular member 25 also has a plurality of radially extending channels 72 which extend from the inner surface 68 of intermediate tube 64 to the apertures in either radial groove 33 or 37. As will be discussed below, the inner surfaces 64 of the intermediate tube 64 help to define a channel through which a vacuum is pulled.

In actual assembly of the first tubular member, the tubular outer shell has the intermediate tube placed therein then the appropriate holes are drilled through both the tubular outer shell and the intermediate tube. First, the tubular outer shell and intermediate tube are welded with the inner surface of the outer shell 27 being welded to the outer surface 69. Once the two components are stabilized and a 3/32" diameter hole is drilled, a 3/32" outer diameter aluminum tube with a 1/16" hole is press fit into the 3/32" hole until it reaches the inner surface 68. This process is repeated until the desired number of channels exist, which in the preferred embodiment shown in FIG. 5 is six. The tops of the tubes can be filed off and each respective radially extending channel 72 sealed in place with an appropriate sealant. Preferably the radial groove is placed on the outer shell after the aforementioned welding and drilling have occurred, but before the insertion of the tubes which make the radially extending channel 72.

The finger shell 42 is approximately 18" long in the preferred embodiment of the invention and has an outer diameter of approximately 2½". Preferably the center of the first radial groove is 2½" from the junction of the finger first end and finger shell. Meanwhile, the second radial groove is approximately 1 9/16" from the junction of the second finger end and finger shell. The spiral groove is 3/32" wide and has a 1" pitch double lead over the entire 18". Similarly, the radial grooves are 3/32". Furthermore, the various longitudinally extending channels 70 are formed having a radius of 5/16". Further, each of the slots are formed being ¼" from the high point of the radius. The intermediate tube is approximately 16½" long and has an outer diameter such that it fits the inner diameter of the outer shell. Preferably both the outer shell and the intermediate tube are fabricated from aluminum.

As can be appreciated from a comparison of FIGS. 1, 2, 7 and 8 the second tubular member 26, also preferably fabricated from aluminum, comprises a first end 80 and a second end 82 as well as an inner surface 84 and an outer surface 86. The longitudinal shape of the second tubular member 26 corresponds to the shape of the plastic product to be produced. Where as here the fabrication system is designed to produce circular plastic pipe, the longitudinal shape of the second section 26 is curved. As can be appreciated in the drawings, the second tubular member 26 also has a plurality of apertures 88 formed therein with these apertures extending between the inner surface 84 and the outer surface 86 of the second tubular member 26. Thus it can be appreciated that the second end of the tubular outer shell 27 of the first tubular member 25 is attached to the curved member first end 80.

It should also be appreciated that the first tubular member is of a first length and the second tubular member is of a second length with this second length being longer than the first length. For example, in the embodiment of the invention discussed herein, the second tubular member measures 42" in length, with the first, 3" being straight. Specifically it should also be appreciated that the diameter of the curved member apertures are greater than the diameter of the first member apertures, primarily because the curved member apertures facilitate the flow of water therethrough while the first member apertures are used to facilitate the pulling of a vacuum. The vacuum assists in stabilizing the shape of the plastic as it is extruded.

The portion of the die manifold assembly 10 secured to die 15 can best be appreciated from a comparison of FIGS. 6 and 7. As can be appreciated from those drawing figures, the die head rear face 93 has secured thereto a rear manifold tube housing 95, with this securing preferably accomplished by four screws. In actual fabrication this rear manifold tube housing comprises three components 95a, 95b, and 95c respectively. It will also be appreciated that manifold tube housing 0-rings 96a, 97b, and 96c are positioned adjacent the corresponding rear manifold tube housing component.

A TEFLON insulative tube 98 connects the interior of the die at the die head rear face 93 with a low pressure air inlet line 99. Still further, a water inlet line, with one tube for each manifold calibration finger is secured to the rear manifold tube housing. This water inlet line 100 permits cool water to be introduced into the manifold assembly.

A rear vacuum pipe 103 extends from the rear manifold tube housing 95 and connects to a rear vacuum line 105. Once again it will be appreciated that the number of rear vacuum pipes 103 and hence the number of rear vacuum lines 105 correspond to the number of calibration fingers 16. A water expulsion pipe 108 also extends from the rear manifold tube housing 95 with each water expulsion pipe 108 being connected to the water expulsion outlet line first section 110. While the rear vacuum pipe and water expulsion pipe are preferably formed of metal, the rear vacuum line as well as the water expulsion outlet line first section are of plastic composition. Each of the water expulsion outlet line first sections 110 connect to a water ejector 112. It has been found that a well ejector package sold by Teel Water Systems as a heavy duty shallow well ejector works quite well to facilitate the removal of water through the manifold following its circulation therethrough. The various water ejectors 112 are secured to a water ejector mounting plate 113 which is part of the die post assembly 20. To facilitate the operation of the water ejector 112 a respective water expulsion inlet lines 115 are secured at the water ejector mounting plate to be secured to the water ejector 112. Similarly, a respective water expulsion outlet line second sections 120 are secured at the water ejector mounting plate to the water ejector. In actual operation, the flow of water through the water expulsion inlet lines 115 into the water ejectors 112 creates a venturi effect which results in the formation of a vacuum which in turn draws the water through the respective water expulsion line first sections and thereafter forceably expels water through the water expulsion outlet line second section 120.

Yet a better appreciation of the inner workings of this improved die manifold assembly 10 can be appreciated from consideration of FIG. 7 which shows a water expulsion port 125 through which the water passes as it is drawn through the calibration finger and secured manifold assembly and then flows through the water expulsion outlet line first sections. The water enters the water expulsion port 125 from the inner manifold tube 130 which is connected to the proximal end 92 of the second component 90.

It will also be appreciated that within rear manifold tube housing component 95b is a vacuum port 135. The distal end of the vacuum tube 140 is held in frictional engagement by the inner surface 68 of the intermediate tube 64 of first, section 25. When the second component 90 is frictionally secured to the distal end of the inner manifold tube 130, the rear vacuum line and rear vacuum pipe 103 permit a vacuum to draw inwardly through the apertures in the radial grooves.

Also shown is a water inlet port 145 through which the water enters the rear manifold tube housing 95c through water inlet line 100. The water thus flows through respective outer manifold tubes 150. Each of inner manifold tube 130, vacuum tube 140 and outer manifold tube 150 is preferably fabricated from stainless steel. A housing connector 155 secures the rear manifold tube housing to a manifold mounting plate 160 which in turn is secured to the die head rear face 93 by appropriate fasteners 163.

Thus, as die manifold tube 165 extends through the die itself, it has therein the outer manifold tube 150 through which cool water is flowing in a first direction, vacuum tube 140 through which a vacuum is being pulled in the opposite direction to the flow of the cool water, and inner manifold tube 130 through which warm water is also being pulled in that second direction thereafter exiting through the water expulsion lines. Within die manifold tube 165 is a preferably hex shaped structure 175 which is placed so as to aid in the support and stabilization of the outer manifold tube 150. It also minimizes the transfer of heat between the cooler tubes and the warmer ones. This hex shaped structure 175 can be appreciated as being positioned adjacent mandrel extension tube 185 of the die, which mandrel extension tube is secured at the front face of the die head at die head apertures 187, which are preferably spanner wrench holes. Mandrel extension tube is screw threaded into a mandrel extension component of the die, with the mandrel extension of the type known in the art.

In actual assembly, the die is assembled so as to encompass the portion of the manifold assembly shown and discussed above with respect to FIG. 7. When finished it resembles the left-most portion of the die head as seen in FIG. 2. The first section 25 is then slid over the secured die manifold assembly 10. The first finger threads 190 are then secured to the threaded terminal corresponding terminal end of the outer die manifold tube. Helping to maintain a good seal are a first pair of O-rings 192 placed within appropriate grooves on the first finger end inner surface 52 as shown in FIG. 7. The first tubular member then is positioned as shown in the middle of die head 17. The second tubular member at its first end 80 has a quick release female mechanism 194 of the type well known in pipe art. In the preferred embodiment of the machine associated with the process of this invention this quick release mechanism is a 1" brass, straight through flow valve manufactured by Parker-Hanifin, which mechanism joins with the quick release male mechanism 195 positioned at the second end 66 of the intermediate tube 64. Thus, when used in combination to form three circular apertures through a pipe wall when viewed in cross-section, the flat sections 60 on each of the calibration fingers are parallel to a flat section on an adjacent calibration finger. A second pair of O-rings 198 are found in appropriate grooves on the inner surface 68.

In actual use, cooling water passes through the water inlet tube 150 and the water receiving channels 70 within each manifold calibration finger while a vacuum is pulled through the middle manifold tube 140 and through the radially extending channels 72 in the first section. The rear manifold tube housing component 95b is preferably welded to vacuum tube 140. Similarly, rear manifold tube housing 95c is preferably welded to outer manifold tube 150. Meanwhile rear manifold tube housing component 95a is preferably screwed onto inner manifold tube. Preferably the flow rate is 4–5 gallons of water per minute per each set of tubes. Still further, water flows from the water receiving channels into the second section 26 and thereafter through the apertures 88 in the second tubular member onto the outer surface 86 of such calibration finger. The water thus flows between the outer surface of the second section and the extruded plastic which surrounds the calibration finger when the plastic is being extruded. The water is deposited within the cavity of the extruded plastic.

Eventually the water level within the cavity reaches the distal tip 89 of the flexible tube 90 where it is sucked back through the interior of this second component 90, through the second component's juncture with the first component 130 preferably within the second section 26, through the water return tube or first component 130 encircled by the die, and finally through the respective tube connecting the water return tube outlet with the water ejector 112.

Figure 9:
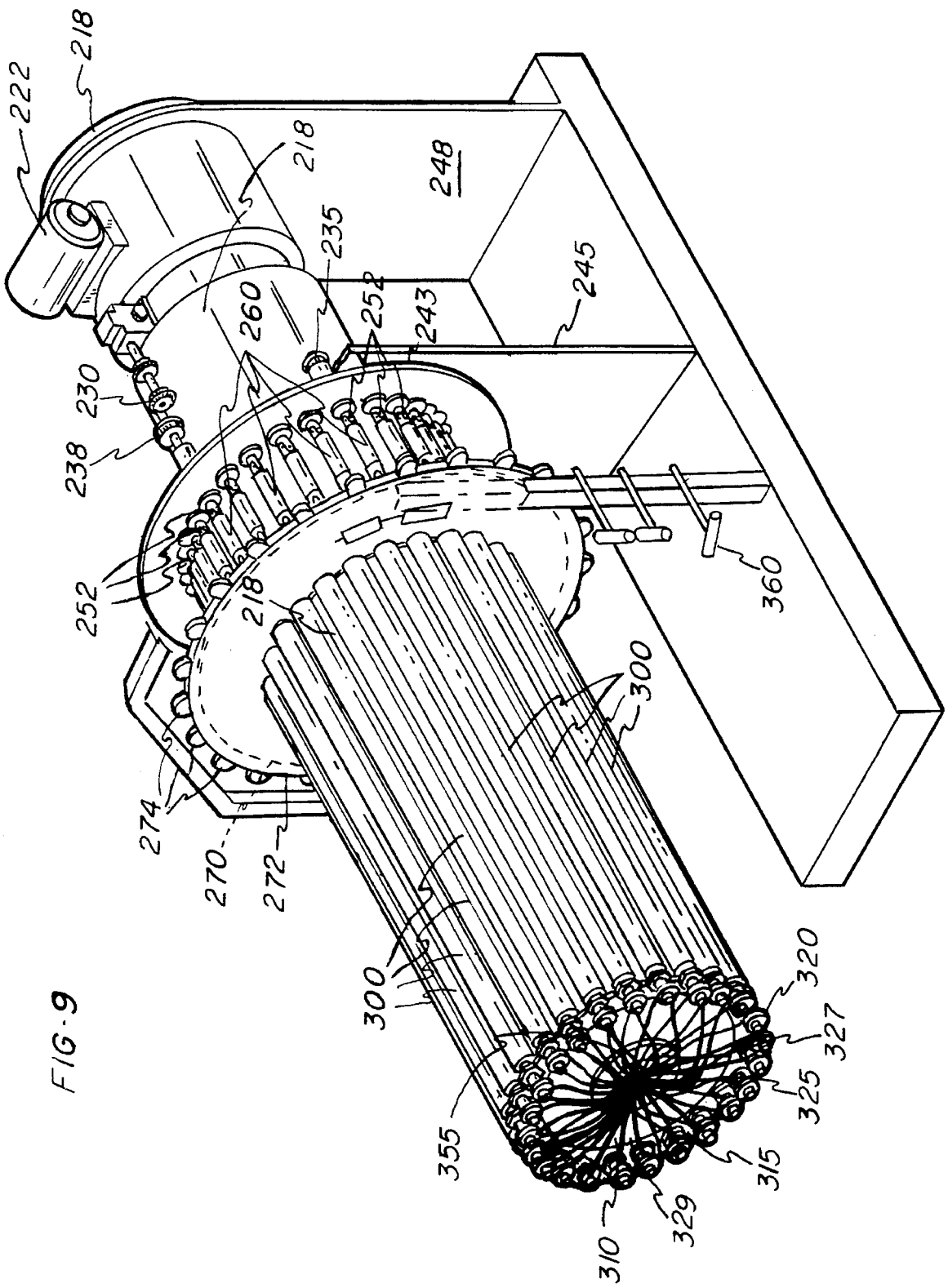
FIG. 9 discloses a perspective view of a former embodying the present invention.

FIG. 9 discloses a perspective view of a former which is part of the current invention designated generally by the numeral 200. The former generally comprises a mounting or base 205, an upstream component 210 and a downstream component 215. As can be appreciated comparing FIGS. 9 and 10, a center tube 218 extends virtually the entire length of the former.

Figure 10:
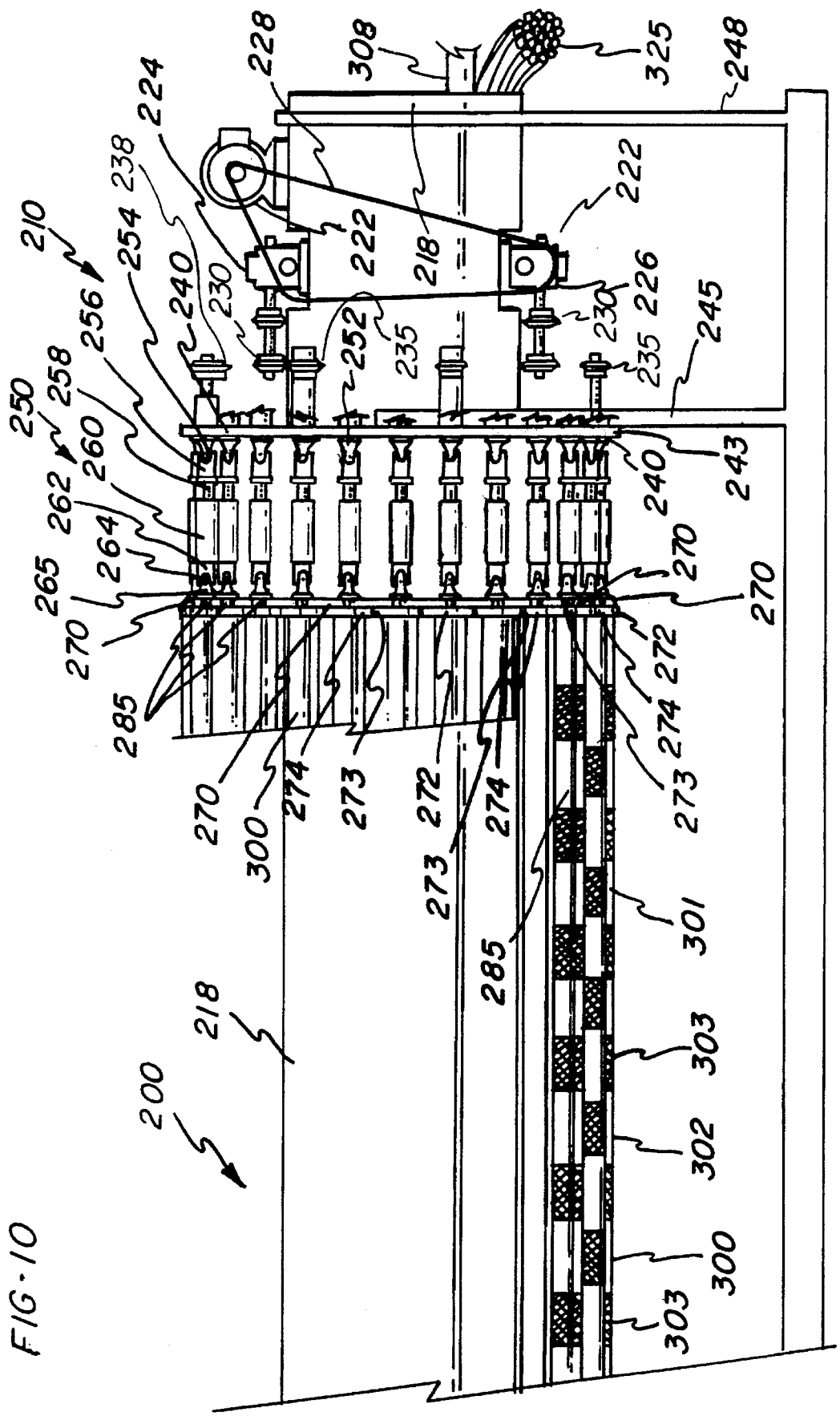
FIG. 10 discloses a partial side elevational view of the former of the invention.

FIG. 10 discloses the gear reducer sub-assembly associated with the serpentine chain drive of this invention. However, it is to be appreciated that a serpentine chain drive is not a new feature, nor is a gear reducer sub-assembly. In this particular invention, the motor 222 associated with the invention is preferably a Baldor 5 hp motor of the type which is commercially available. The first worm gear reducer 224 is preferably a Hub City worm gear reducer, model 451, as is the second worm gear reducer 226. Connecting the motor and two worm gear reducers is a 1" wide timing belt 228.

A chain 229, or more properly in the preferred embodiment, of this invention 4 chains, connects the gear reducer sub-assembly 220 to a first set of sprockets 230, a second set of sprockets 235, and a third set of sprockets 238. Preferably the first sprockets 230 are four Martin 60 BTL2OH sprockets, attached in pairs to each of the worm gear reducers. Each sprocket supplies power to two of the chains. Furthermore, preferably each of the eight second sprockets 235 is a Martin 60 BB15H idler secured to the mounting ring, while the twenty-four third sprockets 238 are Martin 60 BTL16H sprockets. The various sprockets in conjunction with the chain serve to provide the power for the rollers of the former machine. For the sake of clarity, it will be noted that FIG. 2 discloses only part of the total number of sprockets, but at least one of each type is shown.

Comparing FIGS. 1, 2 and 3 discloses that the proximal end of the drive shaft assembly 240 is located adjacent mounting ring 243, which in-turn is secured preferably by welding to the mounting ring support plate 245. It also will be appreciated that the center tube extends through the mounting ring 243. Also extending upwardly from the frame base is a pilot flange support plate 248 which provides additional support for the center tube.

Connected to the proximal end of the drive shaft assembly associated with each of the rollers of this invention is a universal joint assembly 250 having a first end yoke 252, a first cross member 254, a first intermediate yoke 256, a splined shaft 258, a splined coupling 260, a second intermediate yoke 262, a second cross member 264, and a second end yoke 265. All of these components are commercially available. In the preferred embodiment of the invention the yokes are Chicago Rawhide No. 1529, the crosses are Chicago Rawhide No. 1501, and the splined couplings and splined shafts are Hub City 03-32-00026 and 03-32-00030, respectively, as modified. The aforementioned coupling has a slug welded into the coupling end which will be adjacent to the yoke. This slug is then machined so that it will couple with the yoke, and a keyway is cut. Similarly, the spline shaft is modified by cutting it in half, followed by turning the end in and keying it to fit into the yoke end. Each of the third set of sprockets is connected through a respective aperture in the mounting ring to the first end yoke of a universal joint assembly. Similarly, the second end yoke has a bushing spacer 285 positioned between it and the upstream bearing block plate.

Figure 12:
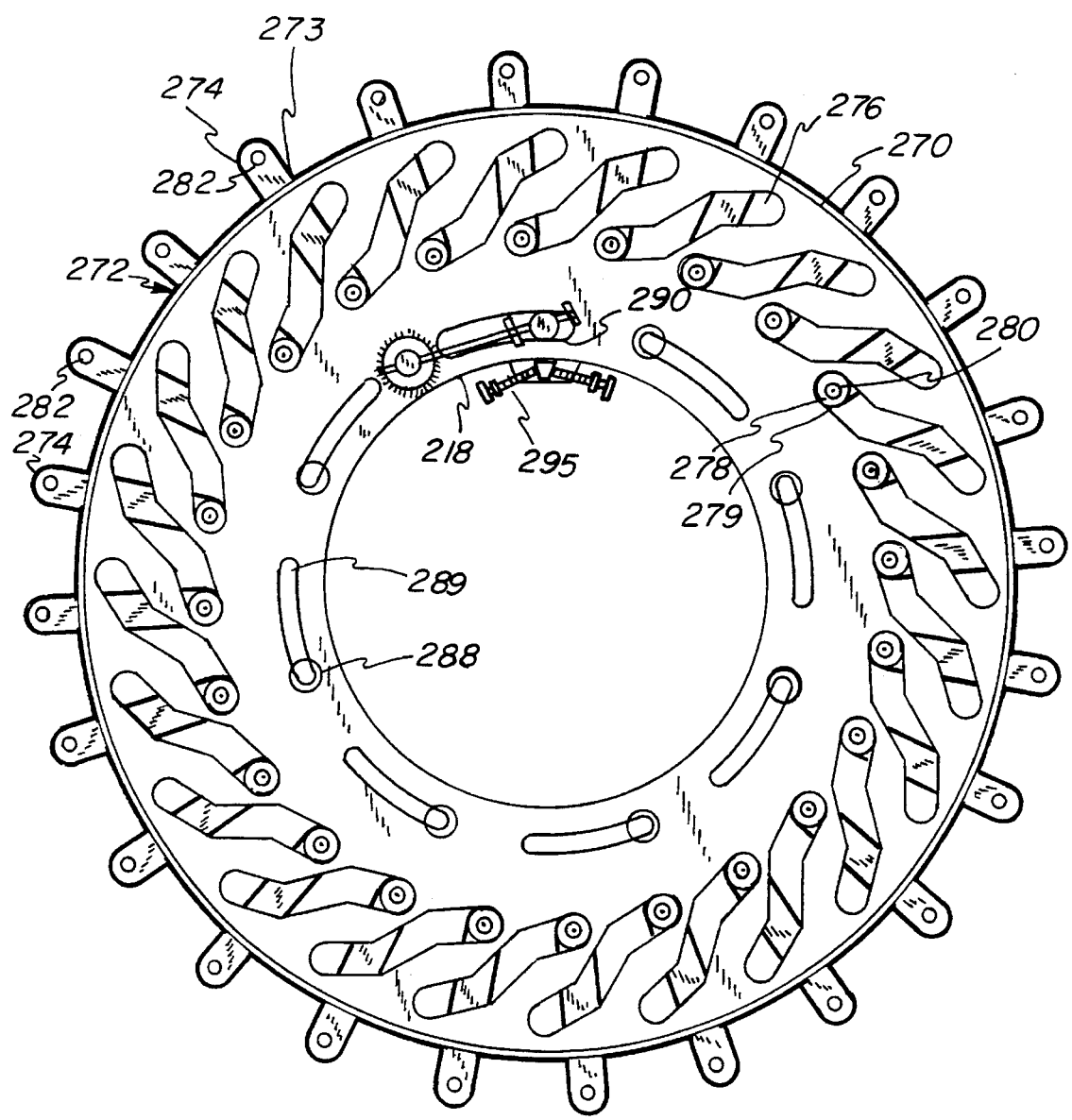
FIG. 12 discloses an elevational view of the upstream cam plate taken looking downstream.

There is also disclosed, as can be appreciated from FIGS. 10 and 12, an upstream cam plate 270, which preferably is a ⅞" thick steel plate. Adjacent the upstream cam plate 270 and immediately downstream therefrom is an upstream bearing block plate 272 fabricated from 1⅛" thick aluminum having a plurality of bearing block plate notches 273 formed therein. Into each of these generally rectangularly shaped notches slide one of a number of bearing blocks 274. The width of each notch is approximately 3", and the depth of each is approximately 6". The width of each bearing block is slightly less than that of the width of each notch. However, the height of each bearing block is approximately 9", such that the top portion of each bearing block extends above the peripheral edge of the bearing block plate. The number of bearing blocks, as well as notches, is equivalent to the number of rollers, which in the preferred embodiment of this invention is twenty-four.

Into the central most end of each of the bearing blocks 274 is screwed a shoulder bolt 278, with this shoulder bolt passing through bushing 279. The exterior surface of each shoulder bolt 278 has formed therein a hex cavity for use in tightening or loosening the shoulder bolt. Each shoulder bolt also passes through a respective upstream cam plate slot 276. Each upstream cam plate slot is a roughly S shaped slot, which in the preferred embodiment of the invention has three straight component sections angled with respect to each adjacent section.

Furthermore, at the outermost end of each bearing blocks 274 is a bearing block aperture 282 through which the former roller first end 285 passes. The former roller first end 285 is secured to the second end yoke 265 of the universal joint assembly 250.

It will also be appreciated that seven lock down bolts 288 are screwed into the upstream bearing block plate 272. Each of these lock down bolts pass through a respective arcuate lock down bolt slot 289 on the upstream cam plate.

To facilitate the transition between two of the pipe sizes capable of being formed with this invention, the size adjustment bolt 290 is must be moved. The size adjustment bolt is formed comprising an adjusting nut which is able to pivot within a housing, which housing is a welded cylinder which extends outwardly from the face of the cam plate. The adjusting nut has a screw threaded channel which extends therethrough parallel to the cam plate. The adjustment bolt also comprises a fixed adjusting screw anchor which is secured to the bearing block plate. Directly adjacent the adjusting screw anchor is a split set collar which is clamped over the screw threaded bolt which extends through the adjusting screw anchor and hence through the adjusting nut. On the opposite side of the adjusting screw anchor is a nut at the end of the bolt to assist in its turning. This size adjustment bolt also adjusts the fine adjustment that can be made with respect to a pipe.

To facilitate movement of the size adjustment bolt, the hock down bolts must first be loosened. Once the lock down bolts 288 are sufficiently loosened, turning the screw threaded size adjustment bolt itself results, depending on which direction it is turned, in either pulling the adjusting nut towards, or pushing it away from the adjustment screw anchor, either of which motions will rotate the upstream cam plate adjacent the bearing block plate 272 as the bushings 279 roll in their respective upstream cam plate slots. This movement causes each bearing block, and hence the end of the roller secured in that bearing block aperture, to move. Consequently, all twenty-four rollers can be moved radially so as to permit the former to accommodate two sizes of pipe, namely 42" and 48" in the preferred embodiment of the invention, when the shoulder bolts are in opposite ends of the upstream cam plate slots.

Also secured to the bearing block plate through a wider arcuate notch in the cam plate is the sku angle adjustment 295. It will be appreciated that the rollers 300 are at a slight angle with respect to each other. This angle helps to regulate the pipe as a pipe section is fed onto the former rollers from an adjacent die manifold assembly. By adjusting the angle of the rollers, the rate the plastic moves along the rollers can be controlled. This rate is important since it controls the speed at which the formed pipe feeds off the former assembly, and this speed is important as it can permit a gap to exist between adjacent pipe sections or in the alternative crowd the weld between adjacent pipe sections.

Figure 14:
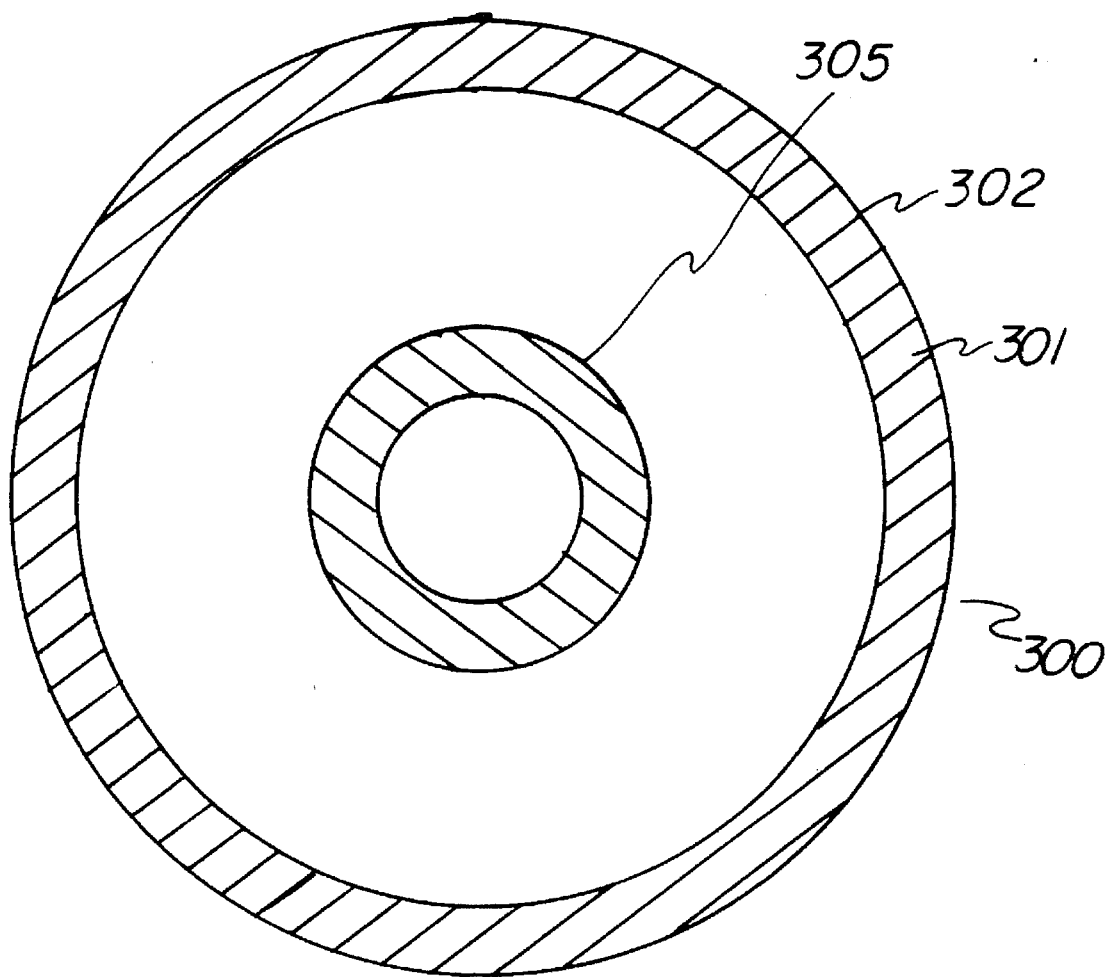
FIG. 14 discloses a vertical sectional view of just the former roller.

To understand how the sku angle adjustment works, it is necessary to understand how the cam plate, bearing block plate, and center tube are positioned. Located intermediate the surface of the bearing block plate and the center tube is an inner ring which is bolted to the center tube. A portion of the inner ring extends radially along the side of the bearing block plate, such that the bearing block plate is secured between the inner ring and the cam plate. Through the wide arcuate notch, two tabs, each with an eye, are secured at opposite ends of the bearing block plate. Each eye has inserted therethrough a bolt, so that the screw threaded end of each bolt faces the opposing bolt. Between these bolt ends is a plate which is also secured to the bearing block plate. By loosening one of the bolts and tightening the other the cam plate and bearing block plate can be made to move as one so as to adjust the sku angle of the rollers. Having reference to a comparison of FIGS. 9 and 14, it will be appreciated that each roller 300 is comprised of a 4" outer diameter steel outer tube 301 having an outer surface 302 having knurled surface portions 303. These knurled surface portions 303 are preferably 4" in width and are spaced 18" apart. Also they are staggered with respect to their position on adjacent rollers. Each roller 300 also has an interior tube 305.

Figure 11:
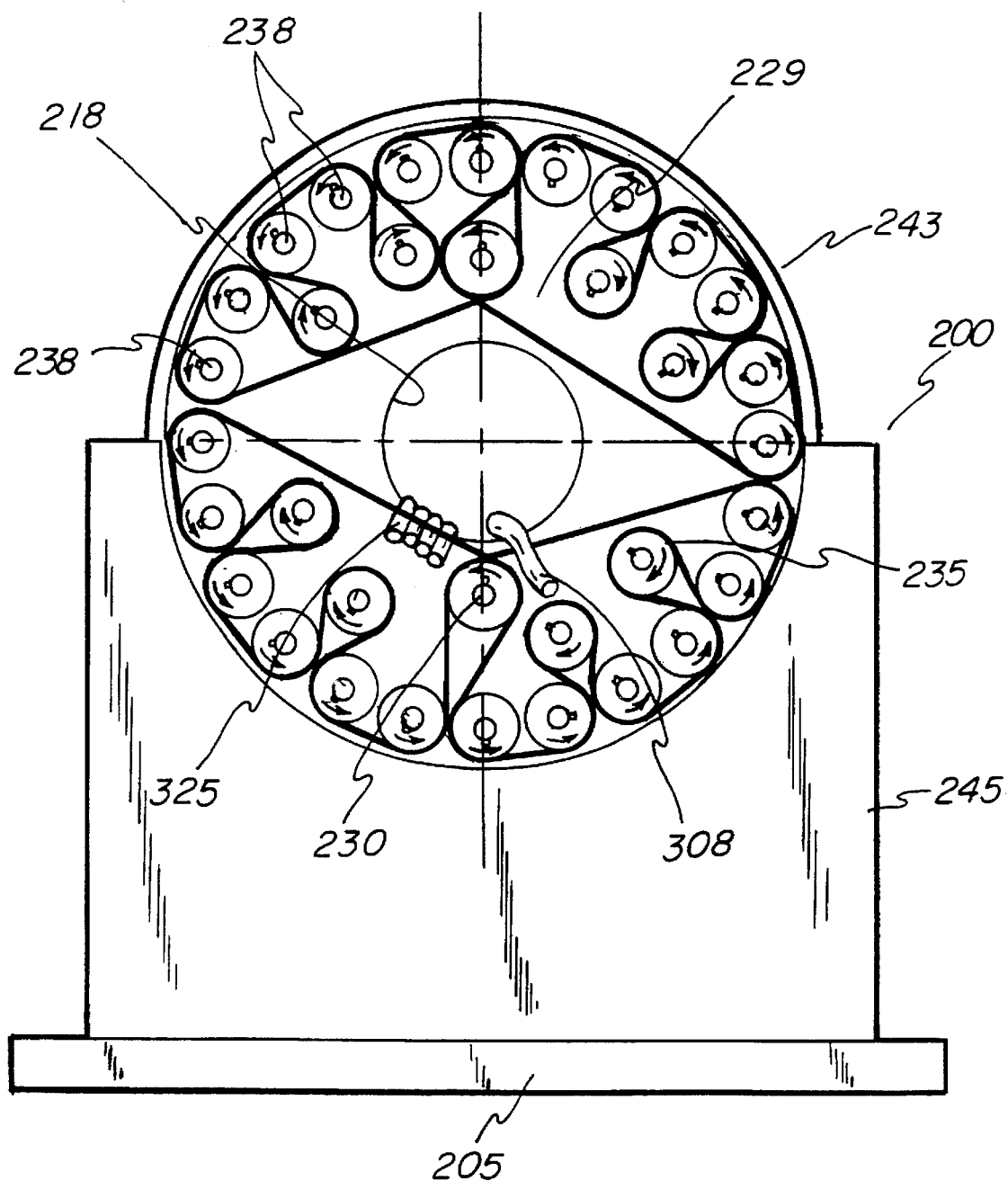
FIG. 11 discloses an upstream end elevational view, which for purposes of clarity does not include the gear reduction sub-assembly.

From a comparison of FIGS. 9, 10, and 11 it will be seen that a ⅜" main water inlet tube 308 passes along through the center tube 218 to the other end of the former where the main water inlet tube connects to a manifold 310 through which the water flows into a plurality of individual water inlet tubes 315. Each of the individual water inlet tubes 315 in turn is connected to a rotary union 320, which in the preferred embodiment of the invention is manufactured by Deublin. Also connected to each rotary union is an individual water outlet tube 325.

In actual operation, cool water passes through the main water inlet tube into the manifold 310. From there the water flows into the individual water inlet tubes. The water then enters the rotary union from where it enters the interior tube 305. The water then passes through the interior tube towards the upstream component 210 of the former. When the water reaches the opposite end of the interior tube it circulates using conventional fluid flow technology into the outer tube 301 of the roller 300. The water then circulates back through the roller towards the downstream component 215 where it exits through the rotary unions into the individual water outlet tubes. This cool water helps to cool the plastic pipe as it wraps around the former rollers.

Figure 13:
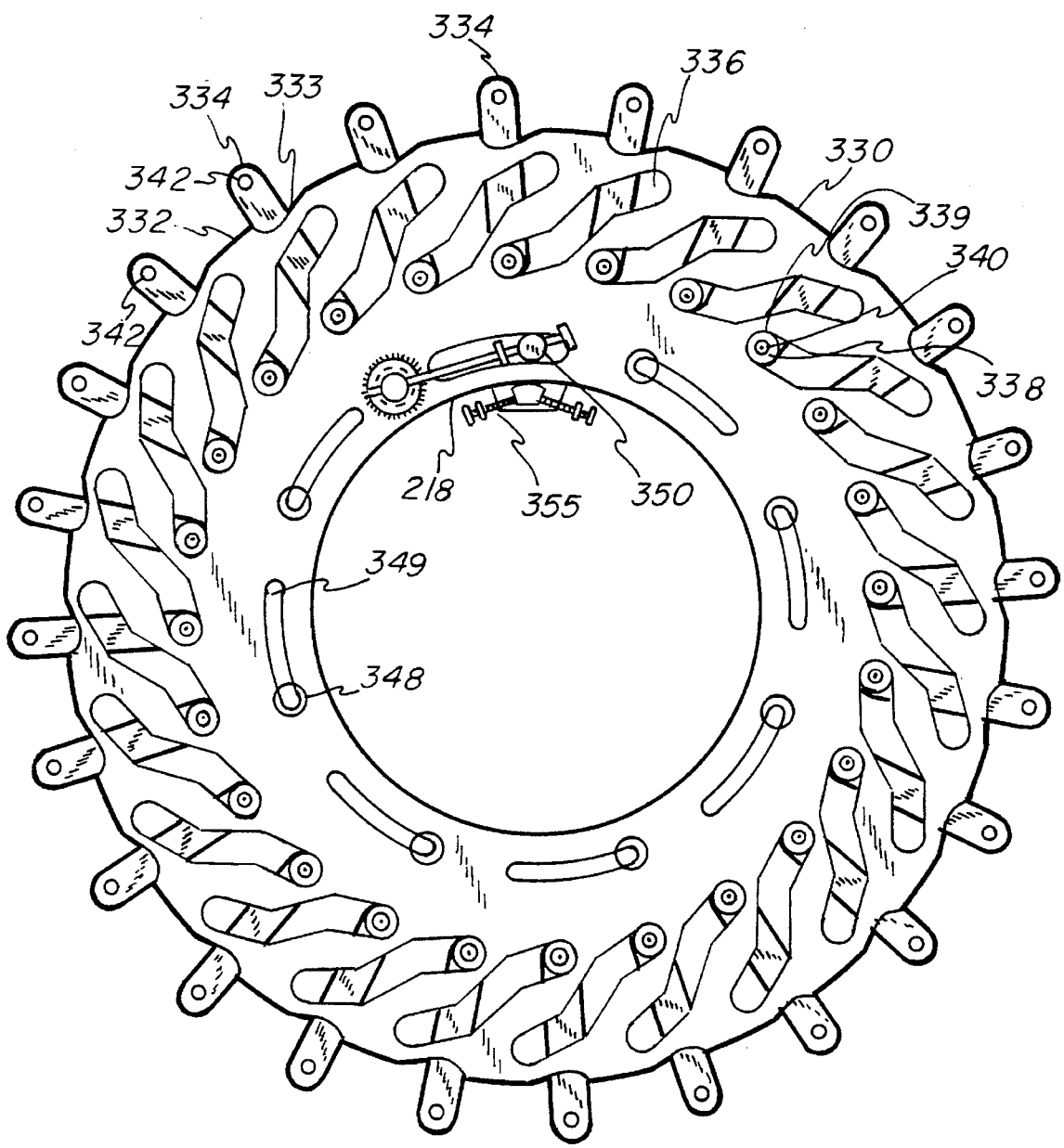
FIG. 13 discloses an end elevational view of the downstream cam plate taken looking upstream.

There is also disclosed, as can be appreciated from a comparison of FIGS. 9 and 13, two manifold apertures through which the individual water outlet tubes 325 pass, preferably twelve through each aperture. The water outlet tubes then pass along the interior of the center tube until they emerge adjacent pivot flange support plate 248. Anti-rotation brackets 329 which restrain the movement of the individual water outlet tubes, are secured to each shoulder bolt 338. Also disclosed is a downstream cam plate 330, which preferably is a ⅞" thick steel plate. Adjacent the downstream cam plate 330 and immediately upstream therefrom is an downstream bearing block plate 332 fabricated from 1⅛" aluminum having a plurality of bearing block plate notches 333 formed therein. Into each of these generally rectangularly shaped notches slide one of a number of bearing blocks 334. Once again, the width of each notch is approximately 3", and the depth of each is approximately 6". The width of each bearing block is slightly less than that of the width of each notch. However, the height of each bearing block is approximately 8½", such that the top portion of each bearing block extends above the peripheral edge of the bearing block plate. The number of bearing blocks, as well as notches, is equivalent to the number of rollers, which in the preferred embodiment of this invention is twenty-four. Thus it can also be appreciated that the rollers taper downwardly by 1" from their attachment near the upstream cam plate to their attachment near the downstream cam plate, since the bearing block apertures are positioned ½" further outwardly at the upstream bearing block plate. This tapering is to account for the cooling of the plastic. Inside each upstream and downstream bearing block aperture is a bearing adjacent the former roller assembly first end or second end respectively.

Into the central most end of each of the bearing blocks 324 is screwed a shoulder bolt 338, with this shoulder bolt passing through bushing 339. The exterior surface of each shoulder bolt. 338 has formed therein a hex cavity 340 for use in tightening or loosening the shoulder bolt. Each shoulder bolt, also passes through a respective downstream cam plate slot 336. Each downstream cam plate slot is a roughly S shaped slot, which in the preferred embodiment of the invention has three straight component sections angled with respect to each adjacent section. Furthermore, at the outermost end of each bearing blocks 334 is a bearing block aperture 342 through which the former roller second end 344 passes.

It will also be appreciated that seven lock down bolts 348 are screwed into the downstream bearing block plate 332. Each of these lock down bolts pass through a respective arcuate lock down bolt slot 349 on the downstream cam plate.

To facilitate the transition between two of the pipe sizes capable of being formed with this invention, the size adjustment bolt 350 is must be moved. The size adjustment bolt is formed comprising an adjusting nut which is able to pivot within a housing, which housing is a welded cylinder which extends outwardly from the face of the cam plate. The adjusting nut has a screw threaded channel which extends therethrough parallel to the cam plate. The adjustment bolt also comprises a fixed adjusting screw anchor which is secured to the bearing block plate. Directly adjacent the adjusting screw anchor is a split set collar which is clamped over the screw threaded bolt which extends through the adjusting screw anchor and hence through the adjusting nut. On the opposite side of the adjusting screw anchor is a nut at the end of the bolt to assist in its turning. This size adjustment bolt also adjusts the fine adjustment that can be made with respect to a pipe.

To facilitate movement of the size adjustment bolt, the lock down bolts must first be loosened. Once the lock down bolts 288 are sufficiently loosened, turning the screw threaded size adjustment bolt itself results, depending on which direction it is turned, in either pulling the adjusting nut towards, or pushing it away from the adjustment screw anchor, either of which motions will rotate the upstream cam plate adjacent the bearing block plate 272 as the bushings 279 roll in their respective upstream cam plate slots. This movement causes each bearing block, and hence the end of the roller secured in that bearing block aperture, to move. Consequently, all twenty-four rollers can be moved radially so as to permit the former to accommodate two sizes of pipe, namely 42" and 48" in the preferred embodiment of the invention, when the shoulder bolts are in opposite ends of the upstream cam plate slots. Also secured to the downstream bearing block plate is the sku angle adjustment 355. It is positioned and operates just as does sku angle adjustment 295 discussed above.

Once the former assembly has been adjusted to accommodate a change in the inner diameter of pipe able to be produced on it, the die manifold assembly needs to have a finger assembly secured thereto which will make the interior dimensions of the wall component for the desired pipe inner diameter.

In operation, the pipe production line of this invention has the plastic wall component formed by extrusion through the die head wound about the former as is known in the art until the first end wall of the wall component is directly adjacent the second end wall of the wall component. After the wall component exits the diehead, a water cooled side wall guide, preferably fabricated from aluminum and secured to the former, stabilizes the first end wall of the wall component by cooling it. A ceramic heater attached to the die post assembly heats, or more accurately reheats, the second end wall. The adjacent wall components then have their respective end walls fused together.

As the end walls fuse together, preferably three TEFLON rollers attached to the housing of the former roll the seam down so that the exterior wall of the pipe appears relatively smooth. To further assist in the cooling of the plastic pipe as it winds around the former, a light mist of water is applied to the outer surface of the now tubular plastic pipe. Preferably at least one cloth, and more preferably two, draped onto the pipe acts to spread the water out onto the pipe's surface to further effectuate cooling. Also preferably a last cloth is draped over the pipe to assist in drying the pipe surface.

It will be readily apparent from the foregoing detailed description of the illustrative embodiment of the invention that a particularly novel and extremely unique machine for the manufacture of plastic pipe, and more particularly a machine capable of forming more than just one diameter of an improved pipe structure is provided. While the form of apparatus described herein constitutes the preferred embodiment of the invention, it is to be understood that the invention is not limited to this precise form of apparatus and that changes may be made therein without departing from the scope of the invention which is defined in the depended claims.

What is claimed is:

1. An improved pipe production line for use in the manufacture of an improved pipe structure comprising
   (1) an improved manifold assembly for use with a die in the extrusion of plastic, said assembly comprising
      (A) a water inlet tube,
      (B) a tube through which a vacuum is pulled,
      (C) a water return tube,
      (D) a calibration finger first section having an outer surface, said first section having: 1) at least one water receiving channel connected to said water inlet tube; 2) a channel connected to said tube through which a vacuum is pulled; and 3) said water return tube positioned centrally of said first section outer surface, said first section having formed therein apertures connected to said channel connected to said tube through which a vacuum is pulled, and
      (E) a calibration finger second section having an outer surface and an interior channel, said second section having said water return tube positioned centrally of said second section outer surface, and said second section having formed there in apertures connected to said interior channel, and
   (2) an improved former assembly, said former can be adjusted to accommodate the forming of more than one diameter of plastic pipe, said improved former assembly comprising
      (A) a housing,
      (B) a center tube supported on said housing,
      (C) a plurality of rollers oriented about said center tube, each of said rollers having a first end and a second end,
      (D) a plurality of universal joint assemblies each having a first end and a second end, each of said first ends being connected to said housing and each of said second ends being connected to one of said rollers, and
      (E) two pairs of cooperating plates, each pair of plates comprising a cam plate and a bearing block plate, each pair of plates being connected to said rollers, the first pair of plates located adjacent the first end of said rollers and said second pair of plates located adjacent the second end of said rollers.

2. The improved pipe production line for use in the manufacture of an improved pipe structure according to claim 1 wherein said cam plates having formed therein a plurality of slots, each of said bearing block plates connected to a roller and each of said bearing block plates having connected thereto a shoulder bolt with bushing, each said shoulder bolt with bushing extending through one of said slots, said cam plate and said bearing block plate able to be rotated relative to each other such that when said plates are rotated each respective shoulder bolt with bushing slides along its respective slot causing each roller to be adjusted radially relative to said center tube.

3. The improved pipe production line for use in the manufacture of an improved pipe structure according to claim 1 wherein said center tube has a main water inlet tube pass therethrough, said main water inlet tube connected to a plurality of individual water inlet tubes, one each of said individual water inlet tubes connected to a respective roller at the roller second end, each roller formed having an interior tube and an outer tube, each roller second end also connected to individual water outlet tubes, said individual water outlet tubes passing completely through said center tube in the direction of the roller first end.

4. An improved pipe production line for use in the manufacture of an improved pipe structure comprising
   (1) an improved manifold assembly for use with a die in the extrusion of plastic, said assembly comprising
      (A) a water inlet tube,
      (B) a tube through which a vacuum is pulled,
      (C) a water return tube,
      (D) a calibration finger first section having an outer surface, said first section having: 1) at least one water receiving channel connected to said water inlet tube; 2) a channel connected to said tube through which a vacuum is pulled; and 3) said water return tube positioned centrally of said first section outer surface, said first section outer surface having formed therein a spiral groove and at least two radial grooves, said spiral groove intersecting at least said two radian grooves, said first section having formed therein apertures connected to said channel connected to said tube through which a vacuum is pulled, said first section apertures located in said radial groove, said water return tube having a first component and a second component secured to each other, said first component terminating within said second section, and said second component extending beyond said second section, said second component being flexible, and
      (E) a calibration finger second section having an outer surface and an interior channel, said second section having said water return tube positioned centrally of said second section outer surface, and said second section having formed therein apertures connected to said interior channel, said first section apertures having a first diameter and said second section apertures having a second diameter, said second diameter being greater than said first diameter, and
   (2) an improved former assembly, said former can be adjusted to accommodate the forming of more than one diameter of plastic pipe, said improved former assembly comprising
      (A) a housing,
      (B) a center tube supported on said housing,
      (C) a plurality of rollers oriented about said center tube, each of said rollers having a first end and a second end,
      (D) a plurality of universal joint assemblies each having a first end and a second end, each of said first ends being connected to said housing and each of said second ends being connected to one of said rollers, and (E) two pairs of cooperating plates, each pair of plates comprising a cam plate and a bearing block plate, each pair of plates being connected to said rollers, the first pair of plates located adjacent the first end of said rollers and said second pair of plates located adjacent the second end of said rollers.

5. The improved pipe production line for use in the manufacture of an improved pipe structure according to claim 4 wherein said cam plates having formed therein a plurality of slots, each of said bearing block plates connected to a roller and each of said bearing block plates having connected there to a shoulder bolt with bushing, each said shoulder bolt with bushing extending through one of said slots, said cam plate and said bearing block plate able to be rotated relative to each other such that when said plates are rotated each respective shoulder bolt with bushing slides along its respective slot causing each roller to be adjusted radially relative to said center tube.

6. The improved pipe production line for use in the manufacture of an improved pipe structure according to claim 4 wherein said center tube has a main water inlet tube pass therethrough, said main water inlet tube connected to a plurality of individual water inlet tubes, one each of said individual water inlet tubes connected to a respective roller at the roller second end, each roller formed having an interior tube and an outer tube, each roller second end also connected to individual water outlet tubes, said individual water outlet tubes passing completely through said center tube in the direction of the roller first end.

7. An improved pipe production line for use in the manufacture of an improved pipe structure comprising (1) an improved manifold assembly for use with a die in the extrusion of plastic, said assembly comprising a plurality of tubular assemblies, each of said tubular assemblies comprising (A) a water inlet tube, (B) a tube through which a vacuum is pulled, (C) a water return tube, (D) a calibration finger first section having an outer surface, said first section having: 1) at least one water receiving channel connected to said water inlet tube; 2) a channel connected to said tube through which a vacuum is pulled; and 3) said water return tube positioned centrally of said first section outer surface, said first section having formed therein apertures connected to said channel connected to said tube through which a vacuum is pulled, and (E) a calibration finger second section having an outer surface and an interior channel, said second section having said water return tube positioned centrally of said second section outer surface, and said second section having formed therein apertures connected to said interior channel, and (2) an improved former assembly, said former can be adjusted to accommodate the forming of more than one diameter of plastic pipe, said improved former assembly comprising (A) a housing, (B) a center tube supported on said housing, (C) a plurality of rollers oriented about said center tube, each of said rollers having a first end and a second end, (D) a plurality of universal joint assemblies each having a first end and a second end, each of said first ends being connected to said housing and each of said second ends being connected to one of said rollers, and (E) two pairs of cooperating plates, each pair of plates comprising a cam plate and a bearing block plate, each pair of plates being connected to said rollers, the first pair of plates located adjacent the first end of said rollers and said second pair of plates located adjacent the second end of said rollers.

8. The improved pipe production line for use in the manufacture of an improved pipe structure according to claim 7 wherein said cam plates having formed therein a plurality of slots, each of said bearing block plates connected to a roller arid each of said bearing block plates having connected thereto a shoulder bolt with bushing, each said shoulder bolt with bushing extending through one of said slots, said cam plate and said bearing block plate able to be rotated relative to each other such that when said plates are rotated each respective shoulder bolt with bushing slides along its respective slot causing each roller to be adjusted radially relative to said center tube.

9. The improved pipe production line for use in the manufacture of an improved pipe structure according to claim 7 wherein said center tube has a main water inlet tube pass therethrough, said main water inlet tube connected to a plurality of individual water inlet tubes, one each of said individual water inlet tubes connected to a respective roller at the roller second end, each roller formed having an interior tube and an other tube, each roller second end also connected to individual water outlet tubes, said individual water outlet tubes passing completely through said center tube in the direction of the roller first end.

\* \* \* \* \*